United States Patent
Wang

[19]

[11] Patent Number: 5,982,648
[45] Date of Patent: Nov. 9, 1999

[54] THREE-PHASE AC-DC CONVERTER

[75] Inventor: Miao-Xin Wang, Fontaine, France

[73] Assignee: Schneider Electric SA, France

[21] Appl. No.: 09/188,330

[22] Filed: Nov. 9, 1998

[30] Foreign Application Priority Data

Dec. 17, 1997 [FR] France ................................ 97 16278

[51] Int. Cl.$^6$ ........................................... H02M 7/12
[52] U.S. Cl. ........................ 363/70; 363/67; 363/125
[58] Field of Search .................... 363/59, 60, 65, 363/67, 69, 70, 125, 126, 127, 128; 307/52, 53, 55, 58, 75, 80, 82, 85–87

[56] References Cited

U.S. PATENT DOCUMENTS

| | | | |
|---|---|---|---|
| 4,471,855 | 9/1984 | Nomura | 187/29 R |
| 4,498,127 | 2/1985 | Fiorina | 363/5 |
| 4,866,591 | 9/1989 | Cook et al. | 363/67 |
| 4,924,371 | 5/1990 | Peterson | 363/89 |
| 4,980,812 | 12/1990 | Johnson, Jr. et al. | 363/44 |
| 5,267,137 | 11/1993 | Goebel | 363/87 |
| 5,406,470 | 4/1995 | Ridley et al. | 363/69 |

*Primary Examiner*—Adolf Deneke Berhane
*Attorney, Agent, or Firm*—Parkhurst & Wendel, L.L.P.

[57] ABSTRACT

The AC-DC converter comprises a first rectifier circuit having a three-phase input and an output in DC. A compensating device is connected between the input and output of the first rectifier circuit to compensate the stray disturbances generated by a current flowing in said first rectifier circuit. The compensating device makes a compensation current flow between the three-phase input and the DC output. Said compensating circuit comprises a second rectifier circuit with controlled rectifiers connected to the three-phase input, a step-up circuit connected between the second rectifier circuit and the DC output, and a control circuit to control the step-up circuit and the second rectifier circuit.

12 Claims, 6 Drawing Sheets

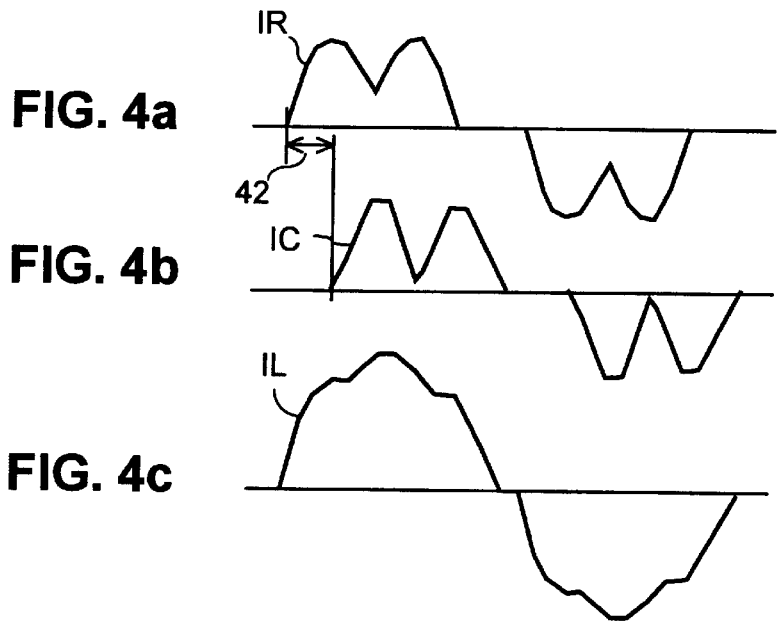
FIG. 4a
FIG. 4b
FIG. 4c
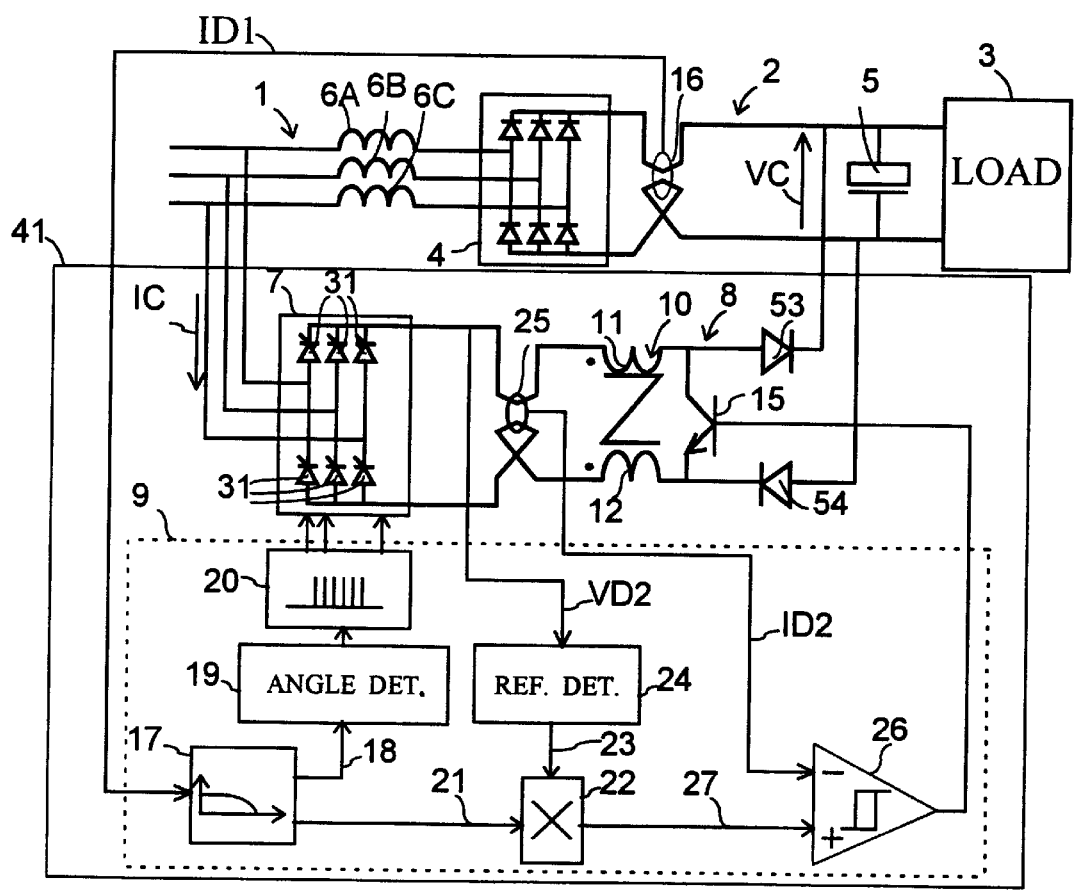
FIG. 5

THREE-PHASE AC-DC CONVERTER

BACKGROUND OF THE INVENTION

The invention relates to an AC-DC converter comprising a three-phase input, designed to be connected to an AC power system having a first fundamental period, a DC output, and a first rectifier circuit connected between said input and said output.

Known converters often comprise three-phase rectifiers with diodes connected to the AC power system and a DC voltage smoothing capacitor connected on output of the rectifier. However this type of converter produces very high harmonic currents on the power system. These harmonic currents generate a high distortion ratio even with input filtering inductors.

To limit the harmonic current ratio, it is known to use controlled chopper transistor rectifiers to take a sine wave current from the power system. However such a converter is very costly and complex. Moreover, the DC output voltage is very high for regulation of the input current. This has the consequence of using overdimensioned components having high voltage withstands.

Other solutions consist in combining diode-based rectifiers with a chopper. However, in such combinations the current flowing in the diodes has a very high frequency. It is compulsory for this type of converters to have high-speed diodes. These diodes also have to be overdimensioned for large current peaks to be able to pass at each chopper pulse. Furthermore, a high frequency filter is necessary to eliminate the chopper frequency.

The solutions proposed in the state of the art are not able to be applied to already installed converters. Compliance with stray disturbance standards then requires total replacement of converters of known type.

SUMMARY OF THE INVENTION

The object of the invention is to achieve a simple and economical three-phase AC-DC converter producing a low harmonic current ratio.

A converter according to the invention comprises a compensating device comprising:

a second rectifier circuit comprising controlled rectifiers connected to the three-phase input, a step-up circuit having an input connected to an output of the second rectifier circuit and an output connected to the DC output, and a control circuit connected to the second rectifier circuit and to the step-up circuit to control a compensation current flowing in said second rectifier circuit and said step-up circuit.

Preferably, the controlled rectifiers of the second rectifier circuit comprise thyristors.

The compensation current compensates current harmonics generated by the first rectifier circuit.

Advantageously, the control circuit commands turn-on of the controlled rectifiers according to a predetermined firing lag.

The control circuit commands the step-up circuit to control the form and amplitude of the compensation current.

In a preferred embodiment, the compensation current has a periodic form having a second period appreciably equal to one sixth of the first fundamental period of the AC voltage of a power system connected to the input.

Advantageously, the compensation current has for each second period a form comprising a first increasing part at the beginning of turn-on of the controlled rectifiers, an appreciably constant second part, and a third decreasing part for turn-off.

Preferably, the increasing first part has a duration comprised between two and three tenths of the second period and the appreciably constant second part has a duration comprised between one half and two tenths of the second period.

In a particular embodiment, the converter comprises common mode current filtering means arranged in series with the step-up circuit.

Preferably, the common mode current filtering means comprise an inductance comprising a first and second windings wound in series in the same direction on a magnetic circuit, said magnetic circuit comprising a magnetic shunt with air-gap disposed between the first and second windings.

Advantageously, the step-up circuit comprises at least one inductor connected to the output of the second rectifier circuit, at least one power semi-conductor connected to said at least one inductor, and at least one anti-return diode connected to said at least one inductor.

According to a different first embodiment, the step-up circuit comprises at least two power semi-conductors connected to said at least one inductor and two capacitors connected in series and connected to the DC output, intermediate common points of the power semi-conductors and of the capacitors being connected.

According to a different second embodiment, said at least one inductor is a primary winding of a transformer.

BRIEF DESCRIPTION OF THE DRAWINGS

Other advantages and features will become more clearly apparent from the following description of particular embodiments of the invention given as non-restrictive examples only and represented in the accompanying drawings in which:

FIGS. 4a to 4c show curves of current flowing in a converter according to FIG. 3;

FIG. 5 shows a detailed diagram of a converter according to an embodiment of the invention;

DETAILED DESCRIPTION OF THE PREFERRED EMBODIMENT

Figure 1:
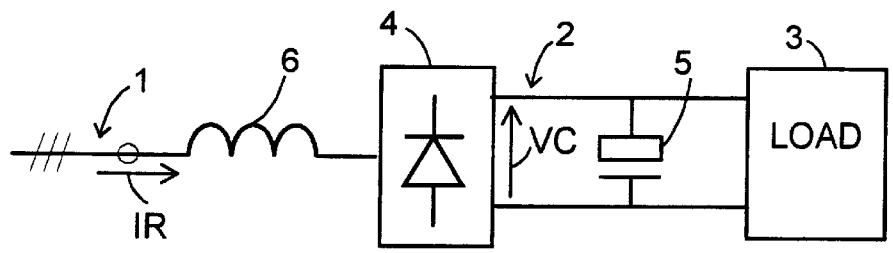
FIG. 1 represents the block diagram of a converter of known type.

The AC-DC converter of known type represented in FIG. 1 comprises a three-phase input 1 connected to an AC power system, a DC output 2 supplying a DC voltage VC to a load 3, and a first diode-based rectifier circuit 4 connected between said input 1 and said output 2. The DC voltage VC is filtered and smoothed by a capacitor 5 connected in parallel on the output 2 between the rectifier circuit and the load 3. An inductor 6 connected in series on the input 1 enables the input currents to be filtered.

Figure 2:
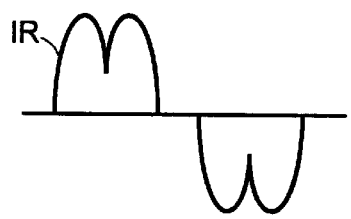
FIG. 2 illustrates the aspect of a current flowing in an input line of a converter according to FIG. 1.

The currents in the input lines of the converter are generally disturbed since the load and capacitor have a DC voltage which imposes non-linear operation of the rectifier. The converter diodes are in fact on when the voltage of the input lines exceeds the DC voltage VC. The form of a current IR of a rectifier input line is represented in FIG. 2. The harmonic ratio of such a current is liable to be very high, and may disturb electrical apparatuses connected to the power system.

In a converter according to an embodiment of the invention, a compensating device makes a compensation current flow between the input and the output to compensate the current harmonics generated by the first rectifier circuit.

To generate the compensation current, the compensating device comprises a second rectifier circuit and a step-up circuit controlled by a control circuit.

Figure 3:
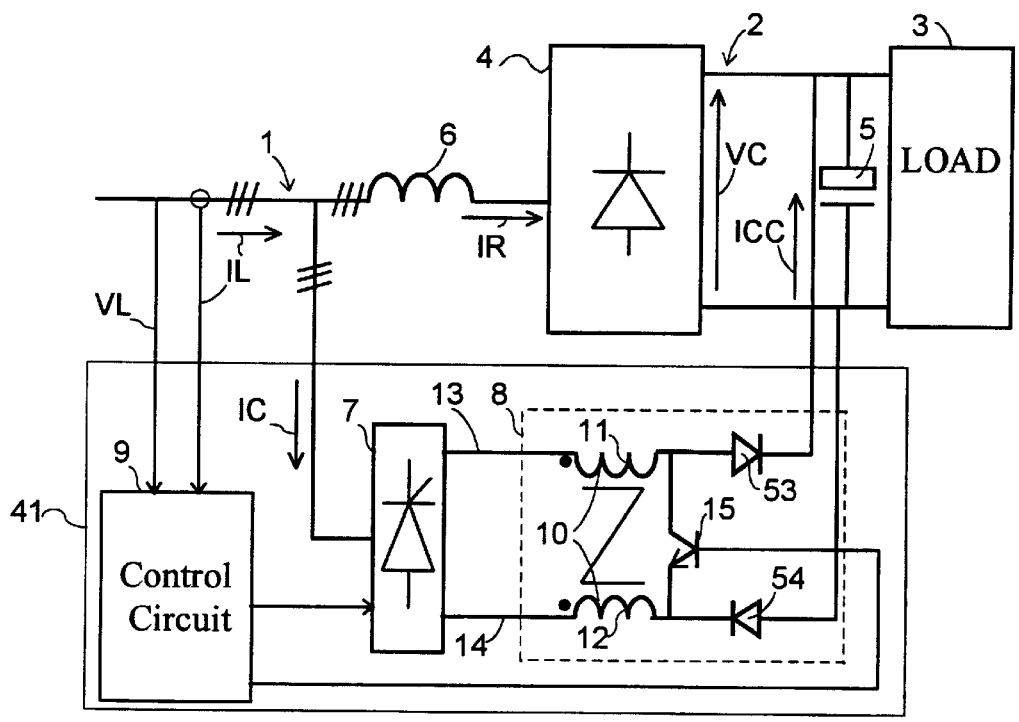
FIG. 3 shows a diagram of a converter according to an embodiment of the invention.

FIG. 3 shows a diagram of a converter according to an embodiment of the invention. The converter comprises a compensating device comprising a second rectifier circuit 7 connected to the three-phase input 1, a step-up circuit 8 connected between the second rectifier circuit and the DC output 2 of the first rectifier, and a control circuit 9 connected to the second rectifier and to the step-up circuit 8 to control a compensation current IC flowing in the second rectifier and the step-up circuit. The compensation current flows in the three-phase input lines of the second rectifier 7.

The second rectifier circuit 7 comprises controlled rectifiers to control the compensation current of each input line. Preferably, the controlled rectifiers are thyristors whose control electrode is controlled by signals supplied by the control circuit 9.

The step-up circuit 8 comprises an inductance 10 arranged over two windings 11 and 12 connected in series on two DC polarized lines respectively 13 and 14 respectively of positive and negative polarity, and a chopper component connected down-line from said inductance windings. The chopper component is for example a transistor having its power electrodes connected to the windings 11 and 12 and the control electrode connected to the control circuit 9. Antireturn diodes 53 and 54 are connected between the down-line parts of the windings respectively 11 and 12 of the step-up circuit and two conductors of the DC output voltage VC of the first rectifier 4. The diodes 53 and 54 prevent discharging of the capacitor 5 when the voltage on the chopper is lower than the DC output voltage VC.

The step-up circuit 8 enables a current IC to be made to flow whatever the input voltage on the power system 1. In this embodiment the step-up circuit comprises a transistor-based chopper which short-circuits the down-line part of the inductance 10 to generate a current and which opens the circuit to input a current ICC generated on the output of the first rectifier 4.

The control circuit 9 receives a current signal representative of the currents IR flowing in the input of the first rectifier or of line input currents IL supplied by the power system. The signal representative of the current IL is also representative of the sum of the currents IR and of the compensation currents IC. The control circuit 9 thus controls the phase and amplitude of the compensation currents IC.

FIG. 4a shows the disturbed current IR of an input phase of a first rectifier 4, and FIG. 4b shows a compensation current IC generated by a compensating device comprising a second rectifier circuit 7, a step-up circuit 8 and a control circuit 9. The current IC has a firing lag 42 with respect to the current Ih. FIG. 4c illustrates a line current IL representing a current IR compensated by a current IC. The current IL thus represents the sum of the currents IR and IC.

Another embodiment of a converter according to the invention is represented in FIG. 5. In this embodiment, a first current measuring device 16 measures the current output from the first rectifier 4 and supplies a signal ID1 to the control circuit 9. The measuring device 16 measures the differential output current between two conductors but rejects a common mode current which could flow between these two conductors. To achieve this function, one of the two conductors is reversed in the device 16 which measures the currents of the two conductors. Thus, the useful output current having an opposite direction in each conductor is represented by the sum of the two currents and the common mode current having the same direction in the two conductors is reduced. The current signal IDI is applied to the input of a low-pass filter 17 of the circuit 9. An output of the circuit 17 supplies a first signal 18 to a determining circuit 19 for determining a firing angle of the controlled rectifiers of the second rectifier circuit 7. The controlled rectifiers preferably being thyristors 31, a control pulse generator circuit 20 is connected between the determining circuit 19 and the second rectifier circuit 7.

The low-pass filter 17 supplies a second signal 21 to a detecting device 22 preferably achieved by a circuit having a multiplier function. This circuit 22 receives a reference signal 23 determined by a reference determining circuit 24 connected to the output of the second rectifier 7. The circuit 24 determines the reference signal 23 according to a voltage signal VD2 representative of the output voltage of the second rectifier circuit 7.

A second measuring device 25 is connected on output of the second rectifier circuit 7. This circuit measures the differential output current and rejects a common mode current. It supplies a signal ID2 representative of the output current to a first input of a comparator circuit 26. A second input of said comparator circuit 26 receives a signal 27 supplied by an output of the detecting device 22. An output of the comparator 26 is connected to the base of the transistor 15 to control the step-up circuit 8.

Figure 6:
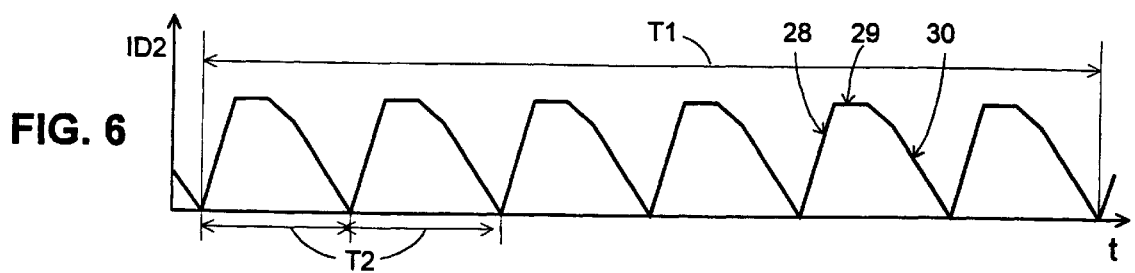
FIG. 6 shows the aspect of a mean, periodic compensation current.

FIG. 6 shows the aspect of a mean periodic compensation current output from the second rectifier circuit 7 and represented by the signal ID2. The global compensation current preferably has a periodic form of a frequency higher than a fundamental frequency of the power system frequency.

In this embodiment corresponding to the frequency of a power system, a period of the power system TI comprises six periods T2 corresponding to the frequency of the output current of the second rectifier. This period T2 depends on the current harmonic to be suppressed.

Preferably, in each period T2 of the compensation current, the current has an appreciably increasing part 28, an appreciably stable part 29 and an appreciably decreasing part 30.

At each beginning of period, the current starts to increase and controlled rectifiers such as thyristors 31 are triggered to turn on. At the end of a period T2, the thyristors 31 turn off awaiting a new command supplied by the circuits 19 and 20.

To determine the desired compensation current, the reference signal 27 is determined according to the voltage signal VD2 and a signal 21 supplied by the low pass filter 17. The reference signal 27 is representative of the form of the current of each period T2. Thus, if the output current of the first rectifier increases, the signal ID1 increases, the signal 21 supplied by the filter 17 increases, and the reference signal 27 consequently has a larger amplitude to increase the compensation current.

Figure 7:
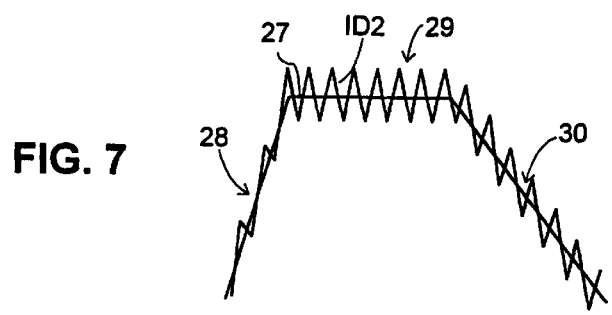
FIG. 7 shows the aspect of a compensation current during a period of said compensation current.

FIG. 7 shows signals applied to the inputs of the comparator 26 during a period T2. The reference signal 27 has a predetermined form supplied by the circuit 22 and the signal ID2 oscillates above and below the reference signal according to the state of the transistor 15. The oscillation amplitude around a mean value appreciably equal to the reference signal depends on the hysteresis of the comparator 26.

Figure 8:
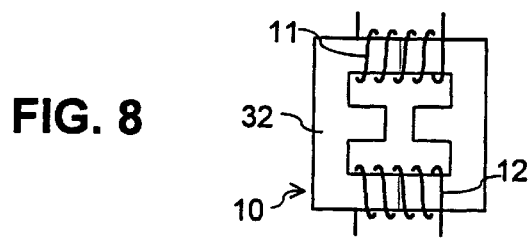
FIGS. 8 to 10 show embodiments of common mode current filters.
Figure 9:
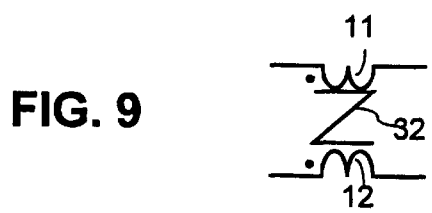
Figure 10:
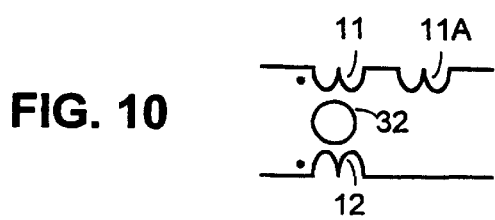

The inductance 10 has a first function enabling a voltage step-up to be generated and a second function enabling a common mode current to be filtered. An inductance 10 is represented in FIGS. 8, 9 and 10.

To perform these two functions, the inductance 10 comprises a magnetic circuit 32 on which two windings are disposed. Each winding is connected in series with an output line of the second converter to filter the common mode current. The windings have passing through them a magnetic flux which adds the values of the inductances of the two windings 11 and 12. In a preferred embodiment, the magnetic circuit comprises a shunt with an air-gap to improve operation. The magnetic shunt is arranged between two portions of the magnetic circuit between the two windings 11 and 12.

The values of the windings 11 and 12 may be identical or different. In FIG. 10 an additional winding 11A is connected in series with the winding 11 to increase the inductance of one line with respect to the other.

Figure 11:
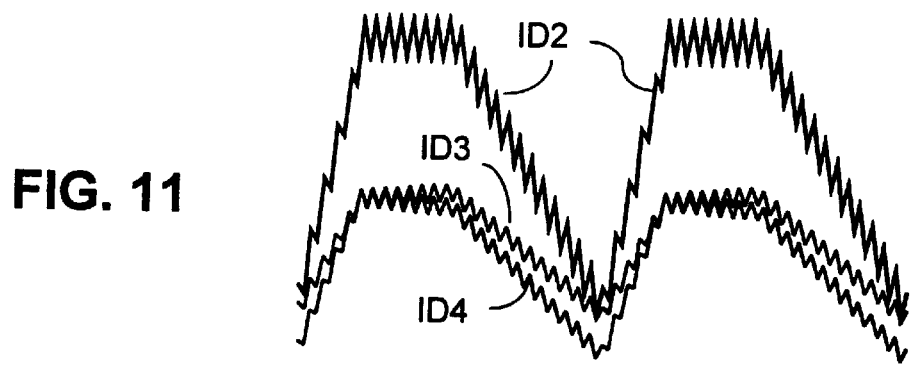
FIG. 11 shows currents of a compensation current period.

FIG. 11 illustrates a current ID3 of a first output line, a current ID4 of a second output line and a signal ID2 representative of the sum of the currents of the output lines of the second rectifier 7. The absolute value of the signals ID3 and ID4 not being identical, a common mode current flows in the second rectifier 7. Regulation of the compensation current is performed on all the output currents represented by the signal ID2.

Measurement of the currents IR represented by the signal ID1 or of the current IC represented by the signal ID2 is preferably performed by common mode current rejection. A first solution consists in reversing one of the two output wires of a rectifier 4 or 7 before running it in one of the measuring devices 16 or 25. In a second solution, it is possible to measure each of the input AC currents of the rectifiers, then to detect a rectified signal representative of the absolute value of each signal and to apply these signals to a summer to have a signal representative of the sum of the absolute value of the current signals.

Figure 12:
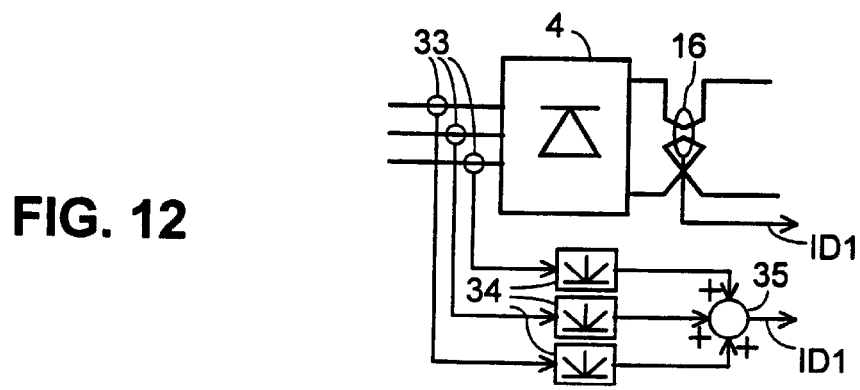
FIG. 12 shows means for measuring the current flowing in the first rectifier.

FIG. 12 shows two possible solutions for measuring the currents flowing in the rectifier 4. Current sensors 33 located on input of the rectifier 4 supply signals to absolute value detectors 34. A summer receives signals detected by the detectors 34 and supplies the signal ID1.

Figure 13:
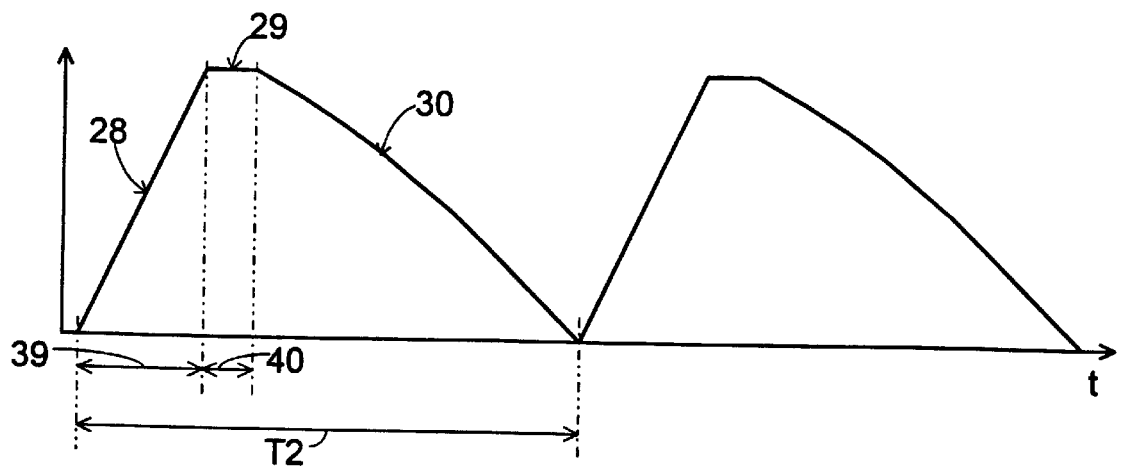
FIG. 13 shows the aspect of a compensation current period.

FIG. 13 shows the aspect of a reference signal 27 or of a mean compensation current represented by the signal ID2.

For a period T2 appreciably equal to a sixth of the power system period T1, an increasing first part 28 preferably has a duration 39 comprised between two and three tenths of the period T2, and an appreciably constant second part 29 preferably has a duration 40 comprised between one half and two tenths of the period T2.

To compensate currents IR having a form similar to that of FIG. 4a, the compensation current IC of each phase will for example have two successive periods T2 with a predetermined current form and a period T2 without current. Then the polarity is reversed as represented in FIG. 4b. The polarity and the presence of the current of predetermined form during a period are controlled by command of the thyristors 31.

Figure 14:
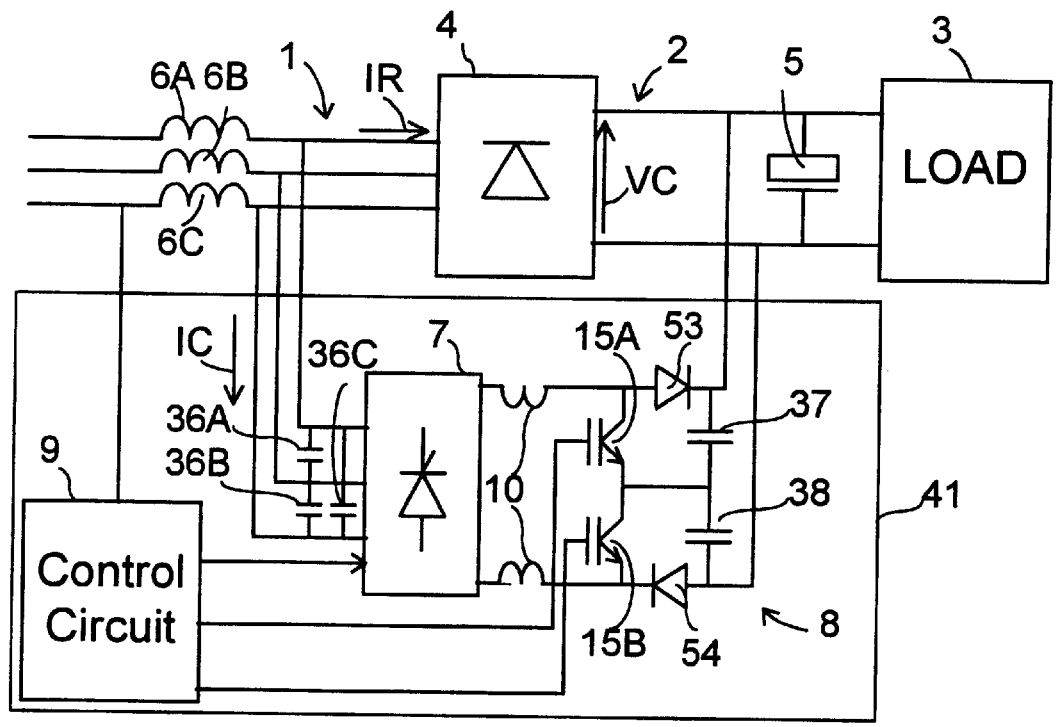
FIG. 14 shows a diagram of a converter according to a second embodiment of the invention.

FIG. 14 shows a second embodiment of the invention. The second rectifier circuit 7 is connected to the input of the first rectifier circuit 4 after filtering inductors 6A, 6B and 6C. Capacitors 36A, 36B and 36C are connected on the inputs of the two rectifier circuits 4 and 7 to perform part of the filtering in association with the inductors 6A, 6B and 6C.

The step-up circuit comprises, in this embodiment, a two-stage chopper comprising two transistors 15A and 15B in series connected down-line from the inductance 10. On output of the step-up circuit, two capacitors 37 and 38 are connected in series on the output DC voltage VC. The common point of the capacitors is connected to a common point between the two transistors 15A and 15B. This arrangement enables the voltage applied to each transistor to be reduced. The transistors 15A and 15B can thus have a lower operating voltage.

Common mode currents can flow between the first rectifier circuit 4 and the compensating device 41. These currents combine with the input currents IR and can modify the current taken from the electrical power system 1. The current forms are then modified and the compensation current must be different.

Figure 15A:
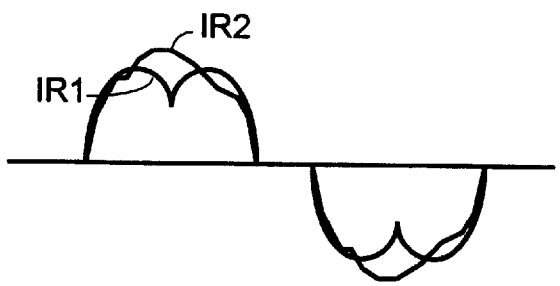
FIGS. 15a to 15c show curves of current flowing in a converter according to an embodiment of FIG. 14.
Figure 15B:
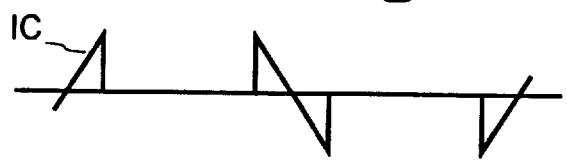

FIG. 15a shows an initial input current IR1 and a current IR2 modified by a common mode current. The current IR2 does not comprise any hollow between two lobes of a half-wave. The compensation current IC must consequently be of different form. A suitable form of the current IC during a period T1 is represented in FIG. 15b.

Figure 15C:
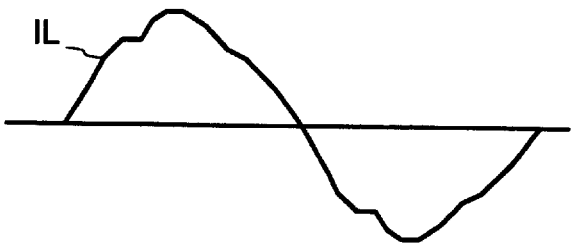

FIG. 15c shows a filtered line current IL comprising less stray harmonics than the input current IR of the first rectifier circuit 4.

Figure 16A:
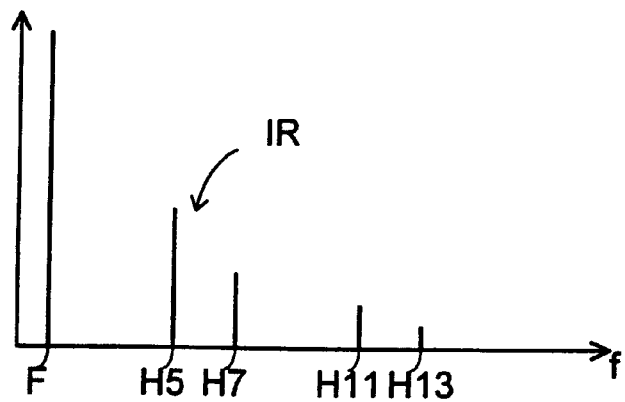
FIGS. 16a and 16b show a spectral analysis of a current flowing in a first rectifier circuit and of a compensated line current.
Figure 16B:
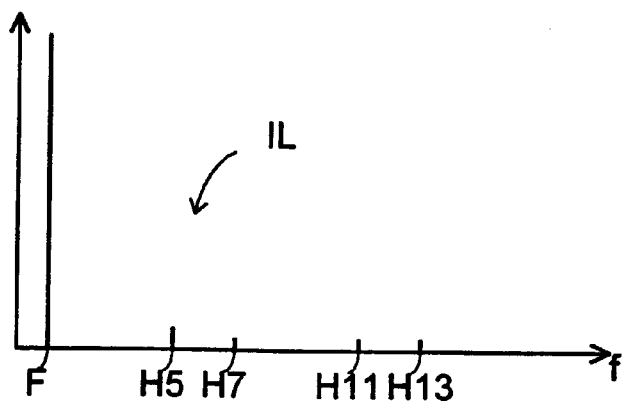

The compensating device 41 is particularly well suited for suppressing current harmonics of levels five H5, seven H7 and eleven H11 with respect to the fundamental frequency F of the power system 1. FIGS. 16a and 16b represent frequency analyses respectively of a current IR and of a current IL with a compensating device.

Figure 17:
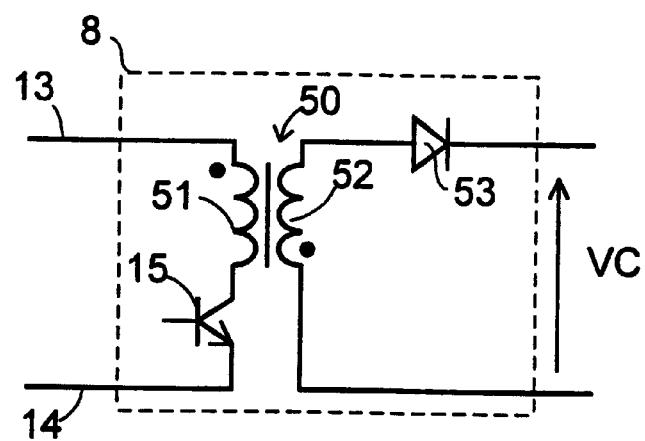
FIG. 17 shows a diagram of a step-up circuit comprising a transformer.

FIG. 17 shows a diagram of a step-up circuit comprising a transformer 50. In this embodiment, the transistor 15 is connected in series with a primary winding 51 of the transformer between the output lines 13 and 14 of the second rectifier circuit. The primary winding thus replaces the inductance 10. A secondary winding 52 of the transformer is connected, via an anti-return diode 53, to the DC output 2 of the first rectifier circuit to input a compensation current. This embodiment enables the common mode currents to be efficiently reduced.

The transistors 15, 15A and 15B are preferably insulated gate field effect bipolar transistors (IGBT), but other types of transistors can be used in particular metal oxide semiconductor (MOS) field effect transistors.

The control circuit 9 can be achieved with logic, analog, or programmed circuits.

The current signals applied to the control circuit can be measured up-line or down-line from the rectifier circuits. They can be measured by various measuring devices, in particular ohmic, inductive, of Hall effect cell, or magnetoresistance type.

The step-up circuit 8 can be achieved by other means in particular by transformer circuits or by capacitor switching circuits.

The controlled rectifiers are preferably thyristors but they can be replaced by controlled cut-out circuits, transistors or other electronic power components.

I claim:

1. An AC-DC converter comprising a three-phase input, designed to be connected to an AC power system having a first fundamental period, a DC output, a first rectifier circuit connected between input and output, and a compensating device, comprising:

a second rectifier circuit comprising controlled rectifiers connected to the three-phase input, a step-up circuit having an input connected to an output of the second rectifier circuit and an output connected to the DC output of said first rectifier circuit, and a control circuit connected to the second rectifier circuit and to the step-up circuit to control a compensation current flowing in said second rectifier circuit and said step-up circuits wherein said compensation current reduces harmonic distortions produced in the input current by said first rectifier circuit.

2. The converter according to claim 1 wherein the controlled rectifiers of the second rectifier circuit comprise thyristors.

3. The converter according to claim 1 wherein the control circuit commands turn-on of the controlled rectifiers according to a predetermined firing lag.

4. The converter according to claim 1 wherein the control circuit commands the step-up circuit to control the form and amplitude of the compensation current.

5. The converter according to claim 1 wherein the compensation current has a periodic form having a second period appreciably equal to one sixth of the first fundamental period of the AC voltage of a power system connected to the input.

6. The converter according to claim 5 wherein the compensation current has for each second period a form comprising a first increasing part at the beginning of turn-on of the controlled rectifiers, an appreciably constant second part, and a third decreasing part for turn-off.

7. The converter according to claim 6 wherein the increasing first part has a duration comprised between two and three tenths of the second period and the appreciably constant second part has a duration comprised between one half and two tenths of the second period.

8. The converter according to claim 1 comprising common mode current filtering means arranged in series with the step-up circuit.

9. The converter according to claim 8 wherein the common mode filtering means comprise an inductance comprising a first and second windings wound in series in the same direction on a magnetic circuit, said magnetic circuit comprising a magnetic shunt with air-gap disposed between the first and second windings.

10. The converter according to claim 1 wherein the step-up circuit comprises at least one inductor connected to the output of the second rectifier circuit, at least one power semi-conductor connected to said at least one inductor, and at least one anti-return diode connected to said at least one inductor.

11. The converter according to claim 10 wherein the step-up circuit comprises at least two power semi-conductors connected to said at least one inductor and two capacitors connected in series and connected to the DC output, intermediate common points of the power semi-conductors and of the capacitors being connected.

12. The converter according to claim 9 wherein said at least one inductance is a primary winding of a transformer.

* * * * *